W. L. SELLECK.
PLANTING MACHINE.
APPLICATION FILED JUNE 7, 1912.
1,067,788.
Patented July 15, 1913.
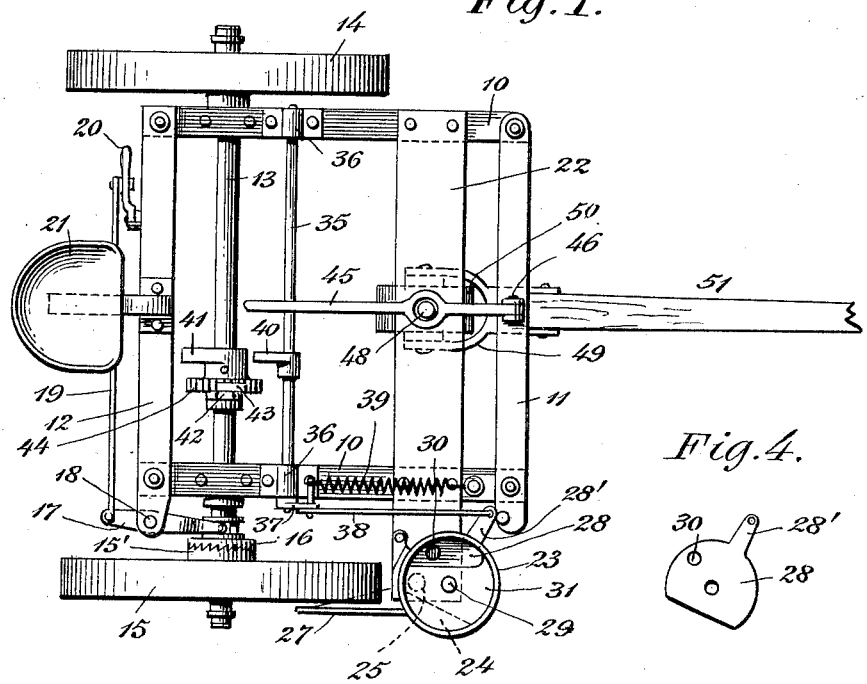
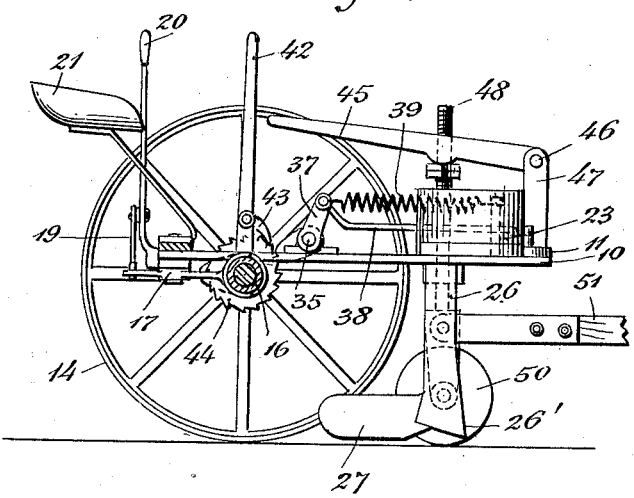
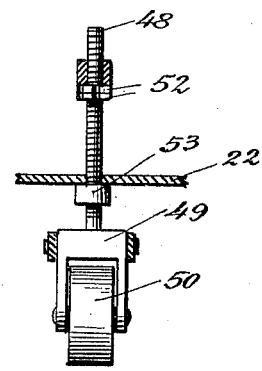
WITNESSES:
INVENTOR.
W. L. Selleck,
BY
ATTORNEY.

UNITED STATES PATENT OFFICE.

WALLACE L. SELLECK, OF PLATTEVILLE, WISCONSIN.

PLANTING-MACHINE.

1,067,788.   Specification of Letters Patent.   Patented July 15, 1913.

Application filed June 7, 1912. Serial No. 702,236.

*To all whom it may concern:*

Be it known that I, WALLACE L. SELLECK, a citizen of the United States, residing at Platteville, in the county of Grant and State of Wisconsin, have invented certain new and useful Improvements in Planting-Machines, of which the following is a specification.

This invention relates to planting machines, and more especially to those employed in depositing corn into rows established by the machine, which also comprises means for covering the corn after it has been deposited.

The invention has for one of its objects the provision of an improved machine of this character in which the corn or other seed to be planted, is measured out in predetermined quantities and in certain fixed intervals during the progress of the machine along the field.

The invention has, furthermore, for its object the provision of means whereby the planting operation may be interrupted when desired, and also of means whereby the commencing of the planting operation may be adjusted at will while the machine itself, is at a standstill.

Further objects of the invention will hereinafter appear and be particularly defined in the claims.

The invention has been clearly illustrated in the accompanying drawings in which similar characters denote similar parts, and in which—

Figure 1 is a top view of a machine equipped with my invention. Fig. 2 is a side view thereof, one of the traction wheels being removed. Fig. 3 illustrates the organization of the steering wheel of the machine, and Fig. 4 is a detail top view of the seed feeding plate.

Referring to the drawing, my improved machine comprises a pair of side bars 10, 10 which are connected at their front ends by a bar 11, and at their rear ends by a tie bar 12. Loosely mounted in suitable bearings attached to the under side of the side bars 10, is a shaft 13 which constitutes the axle of the machine, while at the same time it may act as the principal operating device of the planting mechanism. When the machine is not in actual use for planting purposes, and traveling along the road, this shaft is normally stationary, while the traction wheels 14, 15 rotate freely thereon. On the other hand, when the machine is to be used for planting purposes, the shaft 13 may be clutched to one of the traction wheels, as for instance 15, by any suitable mechanism such as for instance shown in Fig. 1 and comprising a clutch hub 15' which constitutes a portion of the traction wheel 15, and is adapted to be engaged by a clutch collar 16 having a sliding-key connection with the shaft 13, by a lever 17 pivoted at 18 on the tie bar 12, and which is connected by a link 19 with a hand lever 20 which is accessible to the operator on the seat 21 of the machine.

The present machine is adapted to plant one or more rows of corn at the same time, but for the sake of simplicity only one mechanism has been illustrated in the drawings, said mechanism being supported upon a plate or cross bar 22 secured upon the side bars 10. The corn hopper 23 comprises a cylindrical shell, the bottom plate 24 of which is provided with an aperture 25 opening into a boot 26 depending from the under side of the plate 22 and having its lower end 26' plow-shaped, so that when the machine is traveling along the field in operative condition, a proper furrow for the reception of the seed will be formed in the ground. Attached to the rear of the boot is a blade 27 which follows in the wake of the point 26' and re-turns the soil over the deposited seed. In the present instance the machine is adapted to measure out a certain quantity of the seed, at a time, for which purpose I preferably employ what may be termed a "valve plate" 28 pivoted at 29 on the bottom plate of the hopper and extending to the outer periphery thereof in such a manner as to prevent leakage. This valve plate 28 has a perforation or seed-receiving chamber 30 which is adapted, when the plate is oscillated, to be brought into register with the aperture 25 above mentioned. Now, in order to prevent all the seed in the hopper from dropping through the perforation into the boot, when the former and the aperture 25 are in register, and also in order to establish a substantial uniform amount of seed to be fed at each operation, the hopper has a false bottom or guard plate 31 between which and the bottom of the hopper the valve plate 28 plays. This means that whatever amount of seed is contained in the perforation 30, will be cut off from the main supply in the hopper by the oscillation of the valve plate 28.

Means are provided whereby the operation of the valve plate will be established at certain predetermined periods during the linear travel of the machine, as a whole. These means consist preferably of a shaft 35 journaled in bearings 36 on the upper face of the side bars 10, and having an arm 37 connected by a link 38 with an arm 28' forming a part of the valve plate 28, it being understood that the outer shell 23 of the hopper is slotted to permit movement of this arm 28', when the shaft 35 is rocked in its bearings against the action of a spring 39. The valve plate is positively operated for feeding purposes, by the shaft 35 which has an arm 40 secured thereto, the latter being adapted to be engaged by an operator 41 firmly secured to the axle shaft 13. It will be therefore evident that each rotation of the latter will cause one feeding operation. When it is desired to change the commencement of the latter, that is to say; the time when the shaft 35 shall receive the first impulse, the clutch connection between the shaft 13 and the traction wheel 15 is first interrupted, and the shaft 13 may then be turned by a hand mechanism which comprises a lever 42 having a pawl 43 in engagement with a ratchet wheel 44 secured to, or forming a part of, the operator arm 41. Such a change will be particularly useful when the machine has arrived at the end of its travel in one direction, and is then turned around to plant a row during the return trip. At such time it is of course desirable that not only the seeding operation be interrupted, but that furthermore the boot be raised from the ground. The latter effect is produced in the present instance by a hand lever 45 pivoted at 46 on a post 47 which is secured to the tie bar 11. The lever 45 straddles the stem 48 of a yoke 49 in which the steering wheel 50 is suitably supported, and to which the draft bar or pole 51 may be attached. An adjustable collar which may be composed of a pair of check nuts 52 may be threaded upon the stem 48 so as to vary the position of the hand lever to the requirements and ease of the manipulation of the operator. Downward movement of the frame, together with its boot 26, may also be adjusted as desired, as for instance by a collar 53 disposed below the plate 22 which latter has an aperture of sufficient size to permit freedom of vertical movement for the stem 48.

Changes may be made in the general organization as well as in the particular construction of some of the elements composing my improved machine without departing from the spirit of the invention.

I claim:—

1. A seed-planting machine comprising traction wheels, a seed-feeding mechanism comprising a valve plate, a rock shaft connected with and operating said plate, means for normally moving said rock shaft to hold said plate in closed position, an arm on the rock shaft, a rotatable device adapted to intermittently engage said arm to open said valve plate, means for connecting said device with one of the traction wheels, and independent means for rotatively shifting the device relatively to the wheel, while the latter is at rest.

2. A seed-planting machine comprising traction wheels, a seed-feeding mechanism comprising a valve plate, a rock shaft connected with and operating said plate, a spring normally moving said rock shaft to hold plate in closed position against the action of said spring, an arm on the rock shaft, a rotatable device adapted to intermittently engage said arm to open said valve plate, means for connecting said device with one of the traction wheels, and a hand lever having a ratchet-and-pawl connection with said device for rotatively shifting the device relatively to the wheel, while the latter is at rest.

In testimony whereof I affix my signature in presence of two witnesses.

WALLACE L. SELLECK.

Witnesses:
 TRELLA HOLCOMB,
 JAMES DOLAN.

---

Copies of this patent may be obtained for five cents each, by addressing the "Commissioner of Patents. Washington, D. C."